United States Patent [19]

Welschof

[11] Patent Number: 5,549,514
[45] Date of Patent: Aug. 27, 1996

[54] CONSTANT VELOCITY UNIVERSAL BALL JOINT

[75] Inventor: Hans-Heinrich Welschof, Rodenbach, Germany

[73] Assignee: Lohr & Bromkamp GmbH, Offenbach am Main, Germany

[21] Appl. No.: 117,423

[22] Filed: Sep. 7, 1993

[30] Foreign Application Priority Data

Sep. 12, 1992 [DE] Germany ............... 42 30 639.6

[51] Int. Cl.⁶ .................. F16D 3/22; B60K 17/22; B60B 27/00
[52] U.S. Cl. .................. 464/145; 180/258; 384/544; 464/906
[58] Field of Search ................ 464/178, 906, 464/145; 384/544, 589, 542; 180/258, 259; 301/124.1, 126, 131

[56] References Cited

U.S. PATENT DOCUMENTS

| 4,460,058 | 7/1984 | Welschof et al. ............ 180/258 |
| 4,493,388 | 1/1985 | Welschof et al. ............ 180/258 |
| 4,608,028 | 8/1986 | Welschof et al. . |
| 5,100,247 | 3/1992 | Woehler ..................... 384/544 |

FOREIGN PATENT DOCUMENTS

| 2086479 | 12/1971 | France . |
| 3618130 | 12/1987 | Germany . |
| 1297368 | 11/1972 | United Kingdom . |
| 2104191 | 3/1983 | United Kingdom . |
| 2181498 | 4/1987 | United Kingdom ........... 301/126 |
| 2191267 | 12/1987 | United Kingdom . |

Primary Examiner—Daniel P. Stodola
Assistant Examiner—Eileen A. Dunn
Attorney, Agent, or Firm—Harness, Dickey & Pierce

[57] ABSTRACT

A constant velocity universal ball joint for a wheel hub/universal joint unit has a bearing assembly arranged on the wheel hub and tensioned relative thereto by the outer joint part of the universal joint. The joint has an unfastenable connection between the wheel hub and universal joint includes a bolt/nut assembly. The outer joint part and the inner joint part have longitudinally extending ball tracks which are arranged radially opposite one another. The tracks contain torque-transmitting balls which, in turn, are held in one plane in individual windows of a ball cage positioned between the outer joint part and the inner joint part. Upon articulation of the joint, the balls are moved on to the angle-bisecting plane with the outer joint part, at one end, closed by a base part and the inner joint part connected to a shaft. The outer joint part includes a base part which, from the wheel hub end, is insertable into an aperture at the wheel hub end and which forms one of the parts of the bolt/nut assembly for tensioning the wheel hub. The bearing assembly and the outer joint part relative to one another, and which base part, after having been connected to the outer joint part, permanently extends into a free space inside the outer joint part required for assembling the joint and thus cannot be connected to the outer joint part until the joint is completely assembled.

17 Claims, 13 Drawing Sheets

CONSTANT VELOCITY UNIVERSAL BALL JOINT

BACKGROUND OF THE INVENTION

The invention relates to a constant velocity universal ball joint for a wheel hub/universal joint unit with a bearing assembly arranged on the wheel hub and tensioned relative thereto by the outer joint part of the universal joint. The invention has an unfastenable connection between the wheel hub and universal joint which includes a bolt/nut assembly. The outer joint part and the inner joint part have longitudinally extending ball tracks which are arranged radially opposite one another and which contain torque-transmitting balls. The balls are held in one plane in individual windows of a ball cage positioned between the outer joint part and the inner joint part and which, upon articulation of the joint, are moved on to the angle-bisecting plane. The outer joint part, at one end, being closed by a base part and the inner joint part is connected to a shaft. Preferably, at least towards the shaft end, the ball cage is axially supported on inner faces of the outer joint part.

Joints for wheel hub/universal joint units are known from DE 36 18 130 C2, issued Jun. 29, 1989. It already describes advantageous designs in respect of the outer joint part tensioning the bearing assembly relative to the wheel hub and as far as means for transmitting torque between the outer joint part and the wheel hub are concerned. For this purpose, a projection of the outer joint part is provided with axial inner teeth which are engaged by corresponding outer teeth at the end of the wheel hub. The projection rests against the end faces of the inner bearing rings of the bearing assembly, which inner bearing rings, in turn, are supported on a step of the wheel hub. For tensioning purposes, a threaded bolt is used with a long shank, so that any settlement which may occur in the connection can be compensated for without causing any functional disadvantages.

The outer part of the joints used in this case is either designed to be integral with a formed-on base or it is provided with a base which is produced separately and formed in a form-fitting way. The base or base part is provided with a threaded hole for threading in the bolt.

The assembly of such joints is not characterised by any special features. The inner joint part and cage are inserted into one another by pivoting their axes by 90° relative to one another, and they are then coaxially aligned relative to one another. Then, by pivoting their coaxially aligned axes by 90° relative to the axis of the outer joint part, they are jointly inserted into the outer joint part. Subsequently, it is necessary to set an assembly angle between the inner joint part and outer joint part, which angle is greater than the respective maximum operating angle. The balls are individually inserted radially from the outside into the windows of the cage set to be positioned in the angle-bisecting plane, the windows emerging from the outer joint part. At the same time the balls are inserted into the tracks of the inner joint part and by pivoting the inner joint part back into the outer joint part, the balls are introduced from the end face into the tracks in the outer joint part.

For setting the assembly angle of the inner joint part and cage relative to the outer joint part in the way described above, it is necessary to provide the outer joint part with a free space near its axis. The space is used for assembly purposes only and it increases the axial distance between the joint center determined by the ball center plane E and the bearing assembly. To ensure that less space is required and to reduce the moments to be accommodated in the wheel hub/universal joint unit, it is desirable to reduce further the distance between the joint center and the bearing assembly.

SUMMARY OF THE INVENTION

It is an object of the invention to reduce the distance between the joint center and bearing assembly as mentioned above.

The objective is achieved by the outer joint part including a base part which, from the wheel hub end, is insertable into an aperture in the wheel hub end and which forms one of the parts of the bolt/nut assembly for tensioning the wheel hub, the bearing assembly and the outer joint part relative to one another. After being connected to the outer joint part, the base part permanently extends into a free space inside the outer joint part required for assembling the joint and thus cannot be connected to the outer joint part until the joint is completely assembled.

In accordance with the invention, it thus becomes possible to bring the base part and the inner joint part/cage assembly axially closer together so that the distance between the joint center and the bearing assembly is shortened and the overall length reduced. Because the lever arms are shorter, the moments to be accommodated in the connection are reduced while the static and dynamic forces remain the same. The process of assembling the joint which, in any case, requires additional spaces to allow the relative movement between the inner joint part and cage relative to the outer joint part is not obstructed as a result because the base part is initially loose and not moved into its position until after the joint has been assembled.

In a particularly simple and advantageous way, the base part is axially secured to the outer joint part by inserting a retaining ring into the inner circumference of the aperture at the wheel hub end, into which the base part is inserted from the wheel hub end. A simple stop or collar may be arranged towards the joint interior. However, it is also possible to weld the base part and outer joint part together.

As part of the bolt/nut assembly for axial tensioning purposes, the base part designed either as a nut or bolt has to be prevented from rotating relative to the outer joint part. For this purpose, it is possible to provide either a simple press fit, a welded connection or, in a particularly advantageous embodiment, engaging teeth. If the inner joint part includes a projection with inner teeth engaging the teeth of a corresponding projection at the wheel hub, it has been found to be particularly advantageous to allow correspondingly designed outer teeth of the base part to engage inner teeth of the outer joint part which are identical to, and extend in the same way as, the inner teeth of the wheel hub. In this case, to secure the base part axially to the joint interior, the teeth ends may be caulked or riveted together.

In addition to the above-mentioned type of torque transmission from the outer joint part to the wheel hub, it is also possible for the outer joint part to engage only the base part, via teeth, and to provide a second set shaped of engaging teeth between the base part, with a journal shaped projection, and the wheel hub. In this case the torque flows from the outer joint part to the wheel hub via the base part designed as described above.

The above-mentioned designs allow two basic embodiments which are based on, and result in, two different assembly sequences. According to a first embodiment, the free space occupied by the base part after it has been connected to the outer joint part is at least partially occupied by the ball cage and/or the inner joint part when the assembly angle for fitting the balls is being set. The angle is greater than the maximum operating angle of the universal joint.

Assembly takes place in such a way that the inner joint part and cage are inserted into the outer joint part. While the assembly angle between the inner joint part and outer joint part is being set, the balls, from the outside, are individually and radially introduced into the cage windows and tracks of the inner joint part. Thus, by reducing the angle, the balls are, at the end face, introduced into the tracks of the outer joint part. After all balls have been inserted, the base part is introduced into the outer joint part from the hub end and connected to the outer joint part.

According to a second embodiment, the inner joint part may at least partially be coaxially slid through the ball cage. The free space occupied by the base part after it has been connected to the outer joint part, when fitting the balls, is at least partially occupied by the inner joint part or by a supporting member to be connected thereto. With an assembled universal joint, the inner joint part is either directly or indirectly supported on the base part via the supporting member. In this case, assembly takes place in such a way that the inner joint part and cage are inserted into the outer joint part. The inner joint part is at least partially pushed through the cage aperture at the hub end. The balls are introduced through the cage aperture at the shaft end and inserted individually and radially from the inside into the cage windows and tracks of the outer joint part. The inner joint part is pulled back towards the shaft end while the balls are introduced into the ends of the tracks of the inner joint part. Subsequently, the base part is inserted into the outer joint part from the hub end and connected to the outer joint part. It has to be pointed out that, in this case, the inner joint part itself does not necessarily enter the free space later occupied by the base part. This may simply apply to a supporting member associated with the inner joint part, even if the supporting member is not positioned until after all the balls have been inserted.

The assembly procedure proposed here permits a completely new way of assembling a joint, which also leads to the wheel hub/universal joint unit being shortened.

In the case of designs where the balls are inserted by setting an assembly angle, a shaft to be connected to the inner joint part can generally not be introduced until all balls have been fitted completely, as otherwise the shaft obstructs the articulation movement. A further advantageous effect of the present invention includes simplifying the securing means for axially connecting the inner joint part to the plugged-in shaft if a joint in accordance with the invention is used because it is possible to introduce a simple retaining ring into an open circumferential groove in a projecting shaft end. This operation may be effected through an aperture in the outer joint part at the hub end, prior to inserting the base part, and there is no need for more complicated axial securing means which are necessary if the securing ring has to be introduced into a counter-groove of the holding groove before the shaft end is inserted into the inner joint part.

In the case of designs where the balls are inserted when the joint is in a coaxial position and where the inner joint part has to be supported on the base part, it is possible to use a supporting cap arranged on the shaft end or inner joint part or an annular projection at the inner joint part with an end face in the shape of a spherical segment or a central journal projection with an end face in the shape of a spherical segment. Because only an axial movement occurs during assembly, the shaft may be designed to be integral with the inner joint part. Due to the axial assembly, the circumferential length of the cage windows may be reduced, as a result of which the fracture strength of the cage is increased. The window length is determined entirely by the circumferential travel of the balls at the maximum operating angle.

If, towards the interior of the outer joint part, the inner joint part is indirectly or directly supported on the base part and, towards the outside, via the balls and cage, on the guiding faces in the outer joint part, there is no need for the inner joint part to be guided directly relative to the cage. Supporting means of this type may also be used for those designs where the balls can only be inserted by setting the assembly angle. It is advantageous that in such cases, the inside of the cage does not have to be ground, and with the exception of the tracks at the outer circumference, the inner joint part does not have to be machined. In a further advantageous embodiment, because the inner joint part is supported on the base part, the play in the joint may be set by determining the thickness of the retaining ring for axially securing the base part in the outer joint part.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
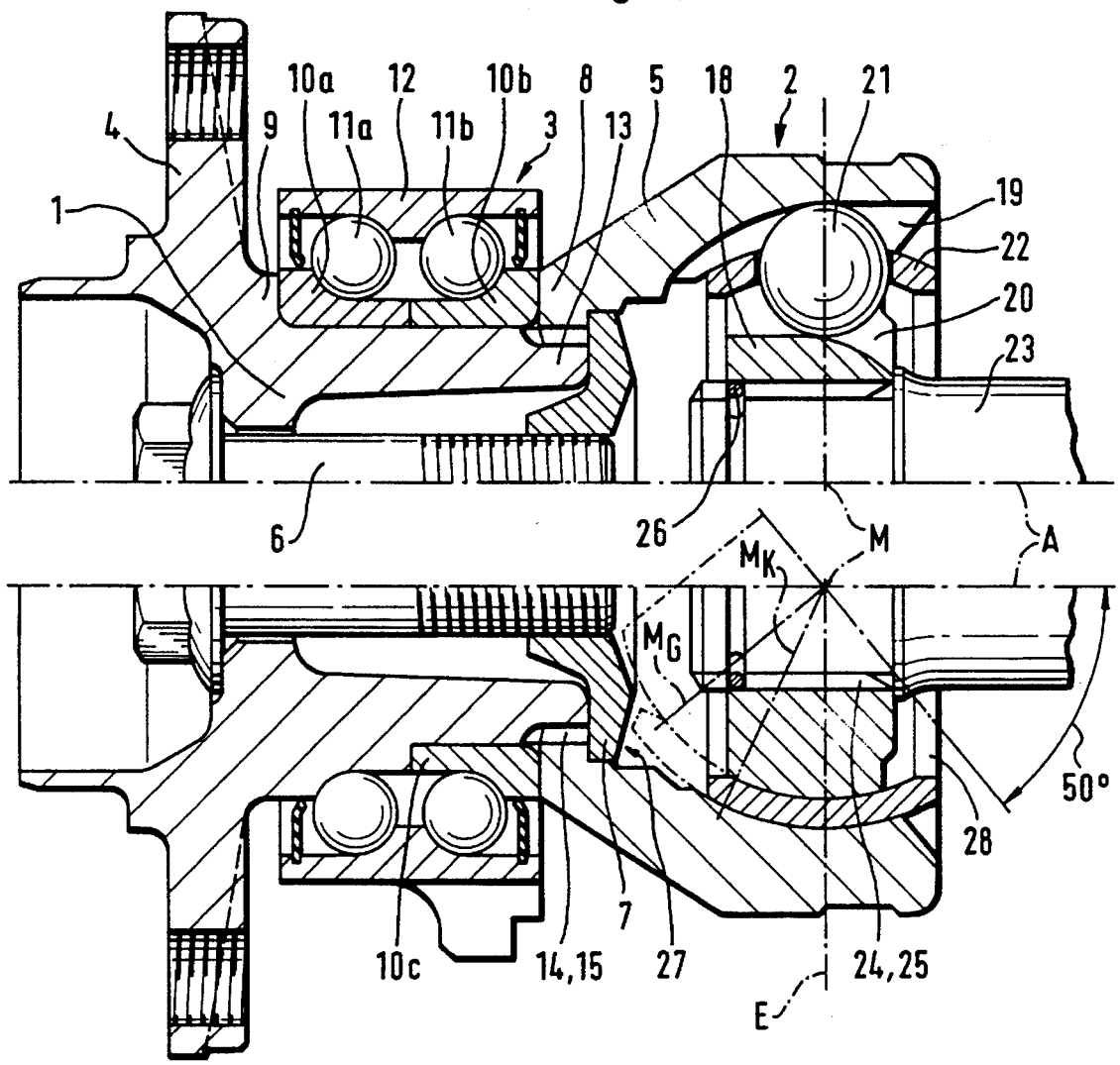
FIG. 1 is a longitudinal section view through a first embodiment of a wheel hub/universal joint unit in accordance with the invention.

FIG. 1 shows a wheel hub/universal joint unit which comprises a wheel hub 1, a constant velocity universal joint 2 and a bearing assembly 3. A wheel flange 4 is integrally formed onto the wheel hub 1. The wheel hub 1 and outer joint part 5 of the universal joint 2 are axially tensioned by a bolt/nut assembly which includes a bolt 6 supported on the wheel flange, and a nut-shaped base part 7 of the outer joint part 5. The outer joint part, at the hub end, is provided with a projection 8 which axially tensions the separately produced inner bearing ring(s) of the wheel bearing 3 against a step 9 at the wheel flange.

The bearing assembly is shown with two separate inner bearing rings 10a, 10b in the upper half of the Figure and with one single separate inner bearing ring 10c in the lower half of the Figure. Furthermore, it is possible to identify two rows of balls 11a, 11b and the outer bearing ring 12. Within the projection 8, there is provided, at the wheel hub 1, an annular projection 13 which axially extends beyond the length of the bearing assembly 3. Inside the projection 8 there are provided inner teeth 14 which, for torque transmitting purposes, cooperate with the outer teeth 15 at the annular projection 13.

Figure 1A:
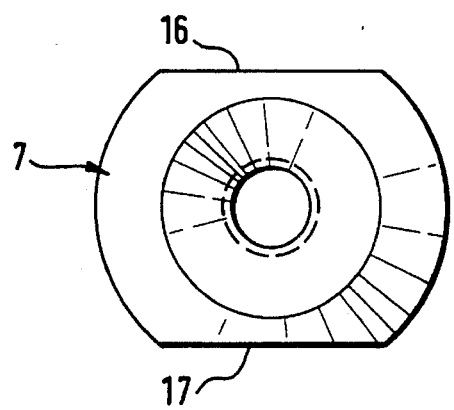
FIG. 1a is a plan view of a base part in accordance with FIG. 1.

The detail shown at FIG. 1A illustrates the base part 7 which includes opposed flat portions 16, 17 so that, in a turned position, it may be slid from the outside into the aperture at the hub end of the outer joint part 5 where it is able to support itself after having been pivoted into the position as illustrated in FIG. 1. It is possible to provide corresponding projections in the outer joint part 5 which cooperate with the flat portions 16, 17 in order to prevent the base part 7 from rotating relative to the outer joint part 5.

The outer joint part receives further joint components designed in the usual way, an inner joint part 18, balls 21 and a ball cage 22, with the outer joint part being provided with tracks 19 and the inner joint part with tracks 20 each accommodating the balls 21. The circumferentially distributed balls are held in a conventional ball cage 22 in a common plane E extending through the joint center M. A shaft 23 is inserted into the inner joint part 18, with inner teeth 24 in the inner joint part and outer teeth 25 at the shaft engaging one another in a non-rotating way. The shaft 23 is axially secured in the inner joint part 18 by a retaining ring 26 at the end of the teeth.

With reference to the shaft center line A there is indicated an angle of 50° which illustrates the articulation of the inner joint part and cage relative to the outer joint part at the maximum operating angle. The lower half of the Figure shows the contour of the inner joint part at the hub end, with the center plane of the inner joint part being indicated by the line $M_G$ which is assumed by the inner joint part when it is articulated by 50°. The contour of the cage when the inner joint part is in such an articulated position is also shown, the center plane of the cage having the reference symbol $M_k$ it can be seen that both the inner joint part and the cage partially enter, at the wheel hub end, an aperture 27 of the outer joint part 5 and that any further articulation which would be necessary for assembly purposes is prevented by the base part 7 inserted in the position as illustrated. This means that all balls must have been inserted before the base part 7 is introduced into the outer joint part 5 from the hub end. Equally, it is only after all balls have been inserted that the shaft 23 can be axially introduced into the inner joint part 18 because any articulation beyond the angle of 50° would be prevented by the size of the aperture 28 of the outer joint part 5 at the shaft end relative to the shaft 23.

Figure 2:
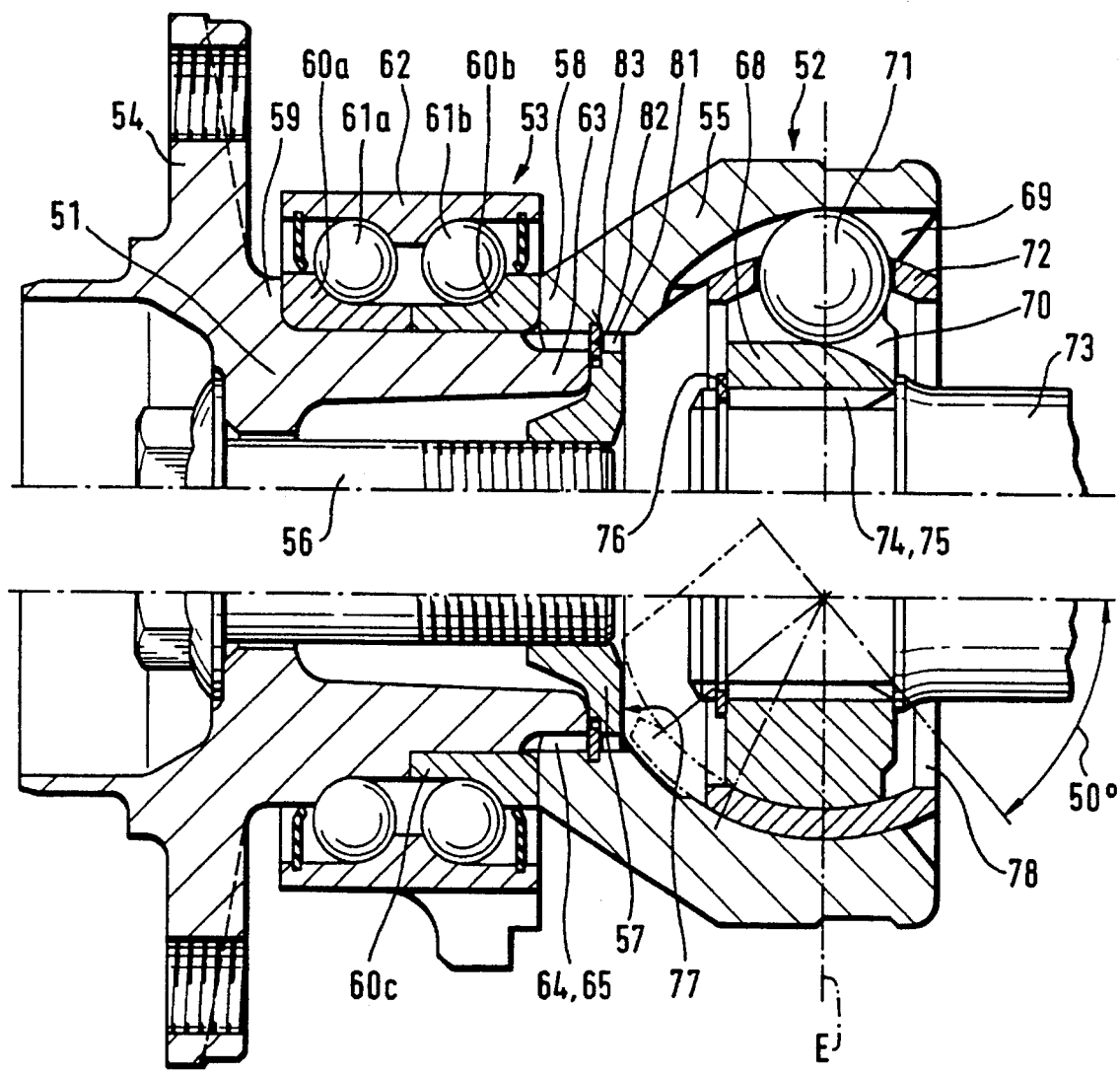
FIG. 2 is a longitudinal section view through a second embodiment of a wheel hub/universal joint unit in accordance with the invention.

In FIG. 2, the reference numbers of any details corresponding to those shown in FIG. 1 are increased by 50. Reference is made to the respective description of FIG. 1. FIG. 2 deviates from FIG. 1 in that the base part 57 includes outer teeth 81 which engage the inner teeth 64 of the projection 58, thereby preventing the base part 57, provided in the form of a nut, from rotating. A securing ring 82 engaging an inner groove 83 in the teeth 64 of the projection 58 axially secures the base part 57 relative to the outer joint part 55. The securing ring 82 is inserted into the aperture 77 after the assembly of the joint has been completed and after the base part has been inserted. Special securing means preventing the base part from being inserted further are not illustrated. Nor are they required after the unit has been tensioned. However, the inner teeth 64 on the inside of the joint may be caulked, as a result of which the base part would also be secured axially inwardly. Otherwise, there are no deviations relative to FIG. 1.

Figure 3:
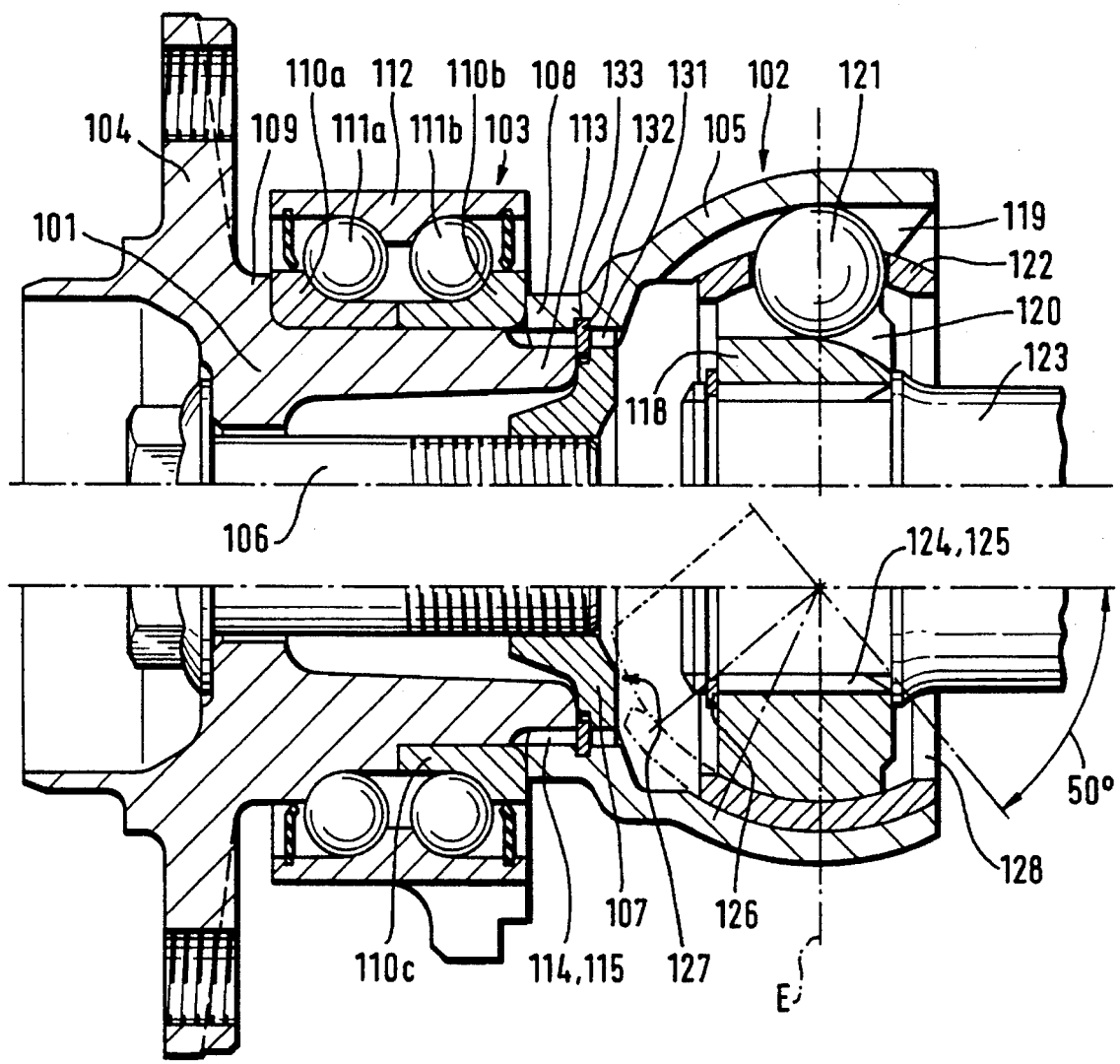
FIG. 3 is a longitudinal section view through a third embodiment of a wheel hub/universal joint unit in accordance with the invention.

In FIG. 3, the reference numbers of any details corresponding to those shown in FIG. 2 are increased by 50. In every respect, reference is made to the descriptions of FIG. 2 and those of FIG. 1. FIG. 3 deviates from FIG. 2 in that the outer joint part 105 is designed as a formed plate metal part with a constant wall thickness. Otherwise, FIG. 3 corresponds fully to FIG. 2.

Figure 4:
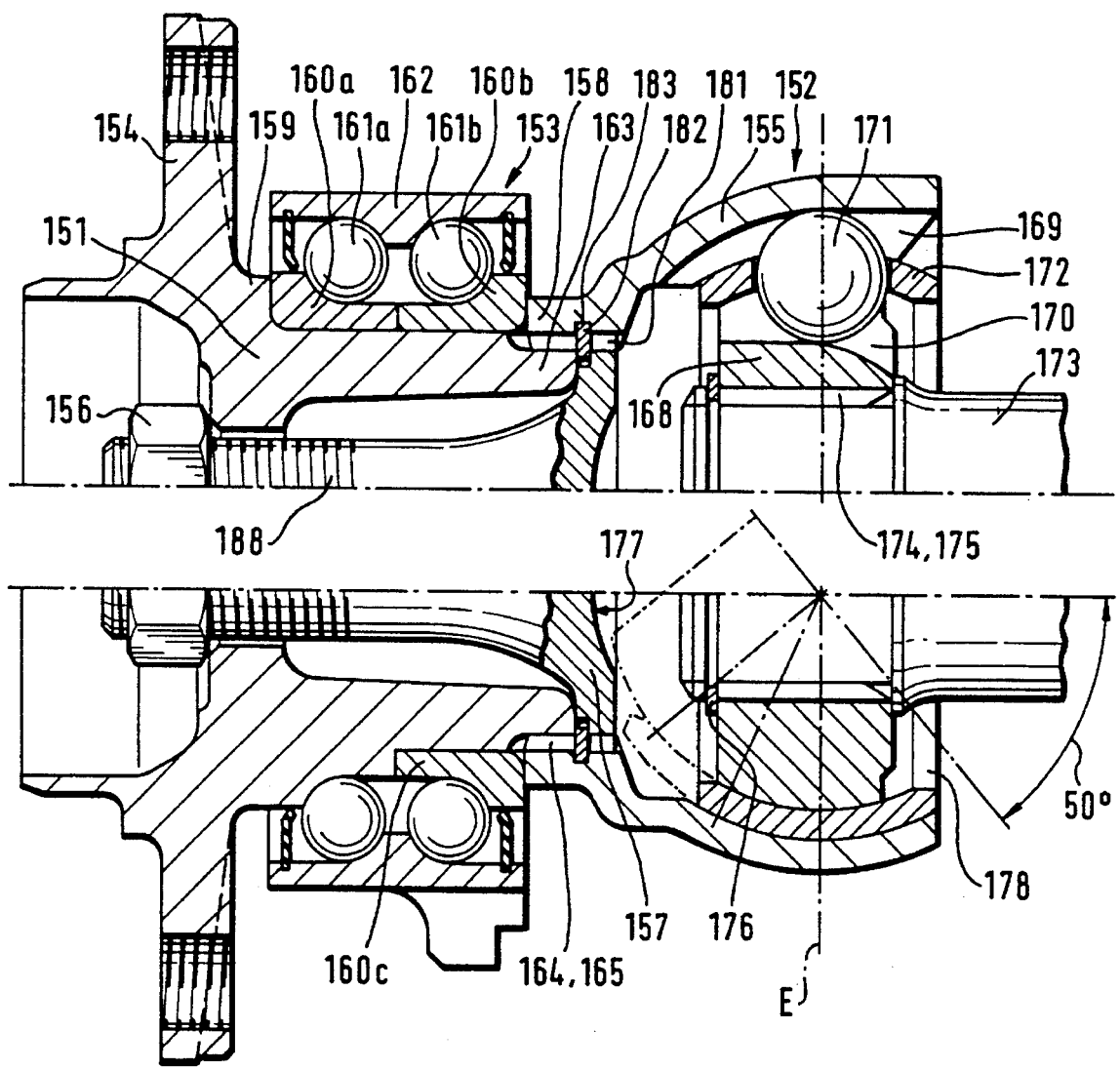
FIG. 4 is a longitudinal section view through a fourth embodiment of a wheel hub/universal joint unit in accordance with the invention.

In FIG. 4, the reference numbers of any details corresponding to those shown in FIG. 3 are increased by 50. In every respect, reference is made to the description of FIG. 3 and, to that extent, to the descriptions of the previous Figures. FIG. 4 deviates from FIG. 3 in that the base part 157 is designed to be integral with a threaded journal 188 whereas a corresponding nut 156 of the bolt/nut connection is supported on the wheel flange. Apart from these deviations, FIG. 4 corresponds fully to the design shown in FIG. 3.

Figure 5:
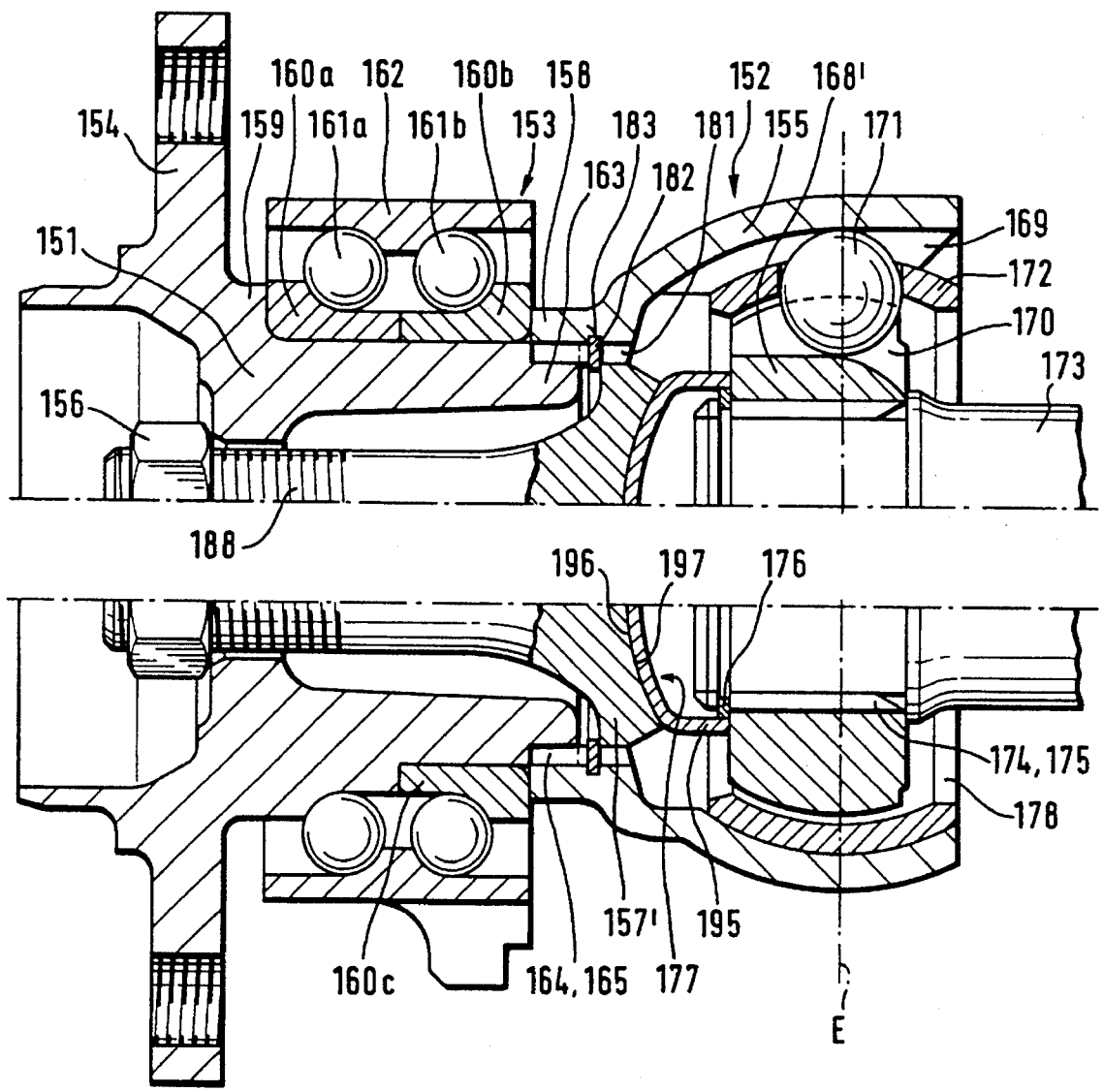
FIG. 5 is a longitudinal section view through a fifth embodiment of a wheel hub/universal joint unit in accordance with the invention.

Any details which are identical in FIGS. 5 and 4 have been given the same reference numbers. Therefore, in every respect, reference is made to the description of FIG. 3 and, to that extent, to the descriptions of the previous Figures. FIG. 5 deviates from FIG. 4 in that the base part 157' includes an internally spherical face 197 which axially supports the inner joint part 168' via a supporting member 195 designed as a plate metal cap and including an externally spherical end face 196. In the opposite direction, the inner joint part 168' is indirectly supported on the outer joint part 155 via the balls 171 and the cage 172. In view of this design, it is possible for the inner joint part 168' to be provided with radial play relative to the inner face of the cage 172. As a result, both surfaces may remain unmachined.

Figure 6:
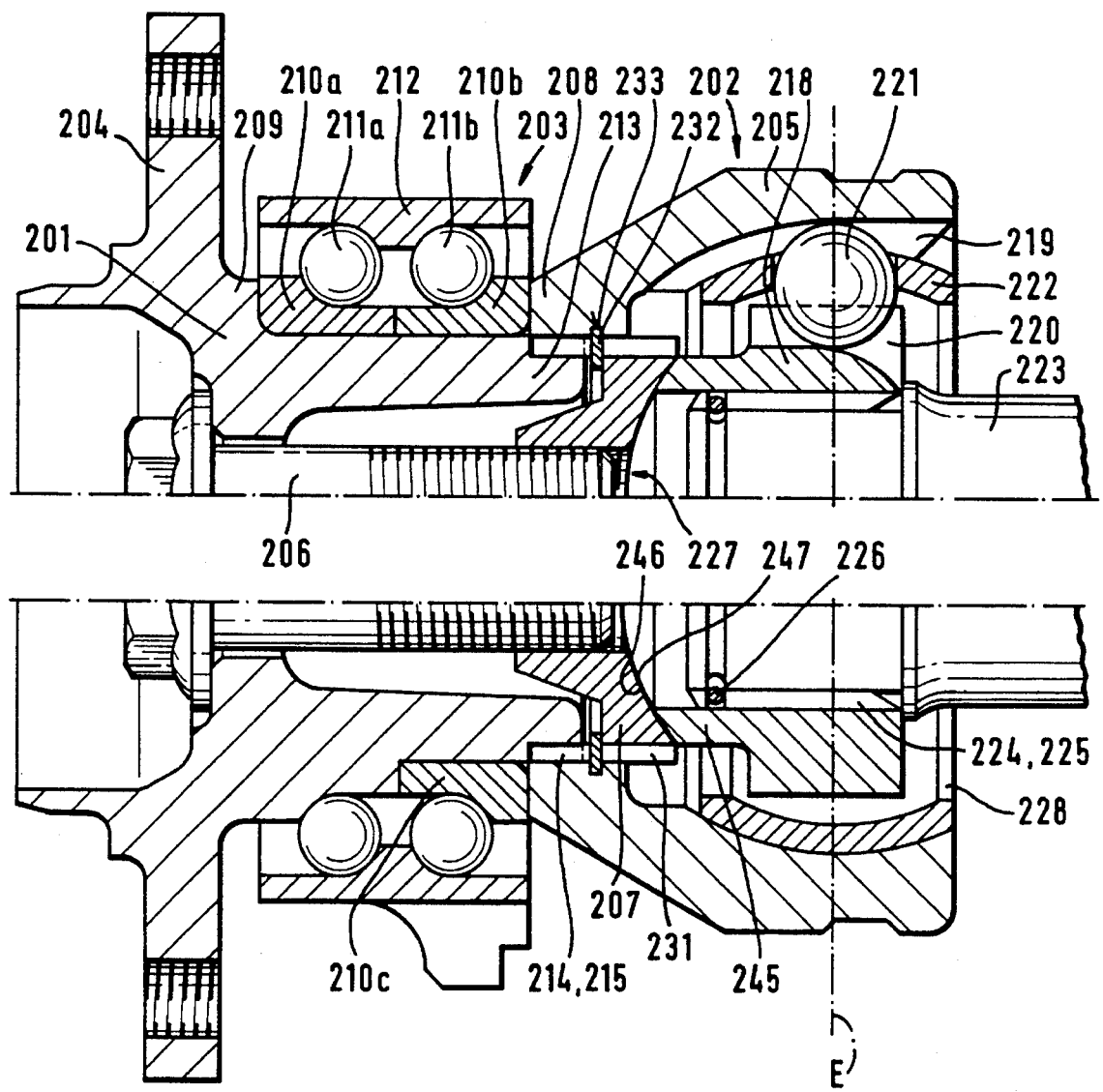
FIG. 6 is a longitudinal section view through a sixth embodiment of a wheel hub/universal joint unit in accordance with the invention.

FIG. 6 shows a wheel hub/universal joint unit which comprises a wheel hub 201, a constant velocity universal joint 202 and a bearing assembly 203. A wheel flange 204 is integrally formed onto the wheel hub 201. The wheel hub 201 and outer joint part 205 of the universal joint 202 are axially tensioned by a bolt/nut assembly which includes a bolt 206 and a nut-shaped base part 207 of the outer joint part 205. The outer joint part, at the hub end, is provided with a projection 208 which axially tensions the separately produced inner bearing ring(s) of the wheel bearing 203 against a step 209 at the wheel flange.

The bearing assembly is shown with two separate inner bearing rings 210a, 210b in the upper half of the Figure and with one single separate inner bearing ring 210c in the lower half of the Figure. Furthermore, it is possible to identify the two rows of balls 211a, 211b and the outer bearing ring 212.

Within the projection 208, there is provided, at the wheel hub 201, an annular projection 213 which axially extends beyond the length of the bearing assembly 203. Inside the projection 208 there are provided inner teeth 214 which, for torque transmitting purposes, cooperate with the outer teeth 215 at the annular projection 213.

The base part 207 is provided with outer teeth 231 which engage the inner teeth 214 of the projection 208 and in this way prevent the base part 207 designed as a nut from rotating. A securing ring 232 engaging an inner groove 233 in the teeth 214 of the projection 208 axially secures the base part 207 relative to the outer joint part 205. The securing ring 232 is inserted into the aperture 227 of the outer joint part at the wheel hub end after the assembly of the joint has been completed and after the base part has subsequently been inserted. Special securing means preventing the base part from being inserted further are not illustrated, nor are they required after the unit has been tensioned. However, the inner teeth 214 on the inside of the joint may be caulked, as a result of which the base part would also be secured axially inwardly.

The outer joint part 205 receives conventionally designed further joint components, the inner joint part 218, balls 221 and a ball cage 222, with the outer joint part being provided with tracks 219 and the inner joint part with tracks 220 each accommodating a ball 221. The circumferentially distributed balls are held in a conventional ball cage 222 in a common plane E extending through the joint center M. A shaft 223 is inserted into the inner joint part 218, with inner teeth 224 in the inner joint part and outer teeth 225 at the shaft engaging in a non-rotating way. The teeth are axially secured by a retaining ring 226 at the end of the teeth.

The outside of the inner joint part 218 is turned in such a way that, for assembly purposes, it may be slid through the aperture of the cage 222 at the wheel hub end and through the aperture 227 in the outer joint part 205 for the base part 207 as long as the base part 207 has not yet been fitted. After fitting the balls which are inserted through the aperture of the cage 222 at the shaft end and introduced radially from the inside into the windows of the cage and the tracks 219 of the outer joint part 205, the inner joint part 218 is withdrawn, so that the balls 221, at the end face, enter the tracks 220 of the inner joint part. After all the balls have been inserted, the shaft 223 may be axially introduced into the inner joint part. The inner joint part, at the hub end, includes an annular projection 245 which, at its end face, includes a spherical surface 246 via which the inner joint part, towards the wheel hub end, is directly axially supported on an internally spherical face 247 of the base part 207. Towards the shaft end, the inner joint part, as a result of the shape of the ball track, is indirectly axially supported via the balls 221 and the cage 222 on the internally spherical face in the outer joint part 105. The axial play in the joint may be determined via the thickness of the securing ring 232 inserted into the groove 233 in the projection 208 in the outer joint part 205.

Figure 7:
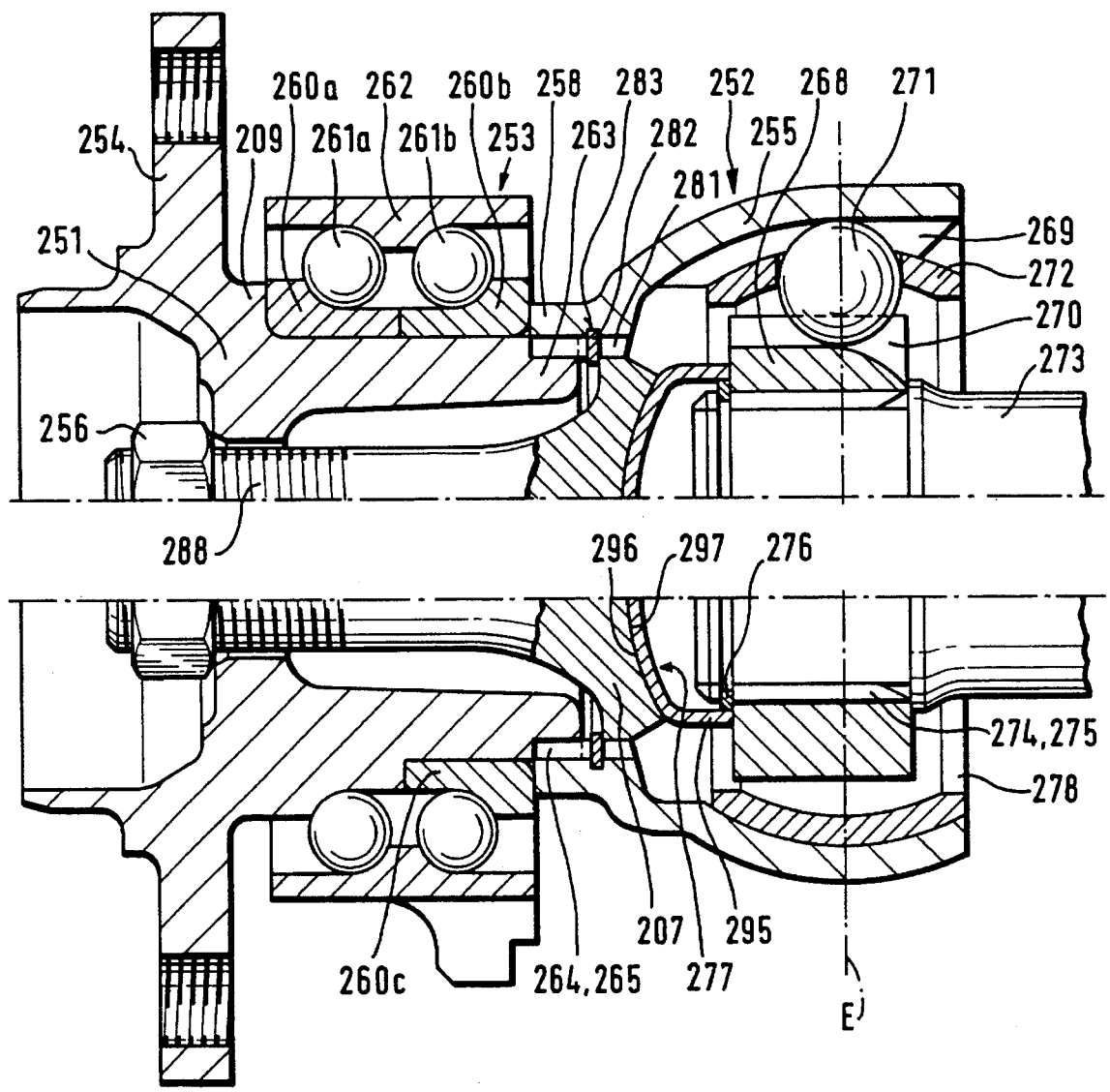
FIG. 7 is a longitudinal section view through a seventh embodiment of a wheel hub/universal joint unit in accordance with the invention.

In FIG. 7, the reference numbers of any details corresponding to those in FIG. 6 have been increased by 50. To that extent, reference is made to the contents of the description of FIG. 6. FIG. 7 deviates from FIG. 6 in that the outer joint part 205 is designed as a formed plate metal part with a substantially uniform wall thickness. Further deviations consist in that instead of a projection at the inner joint part 268, there is provided a clamped-on plate metal cap 295, which has a closed surface 296 in the shape of a spherical segment which is supported on the internally spherical surface 297 of the base part 257. Again, as shown in FIG. 4, the base part 207 is provided with a threaded journal 288 which forms part of the bolt/nut assembly to tension the hub and outer joint part relative to one another, while a nut 256 is supported on the wheel flange.

Figure 8:
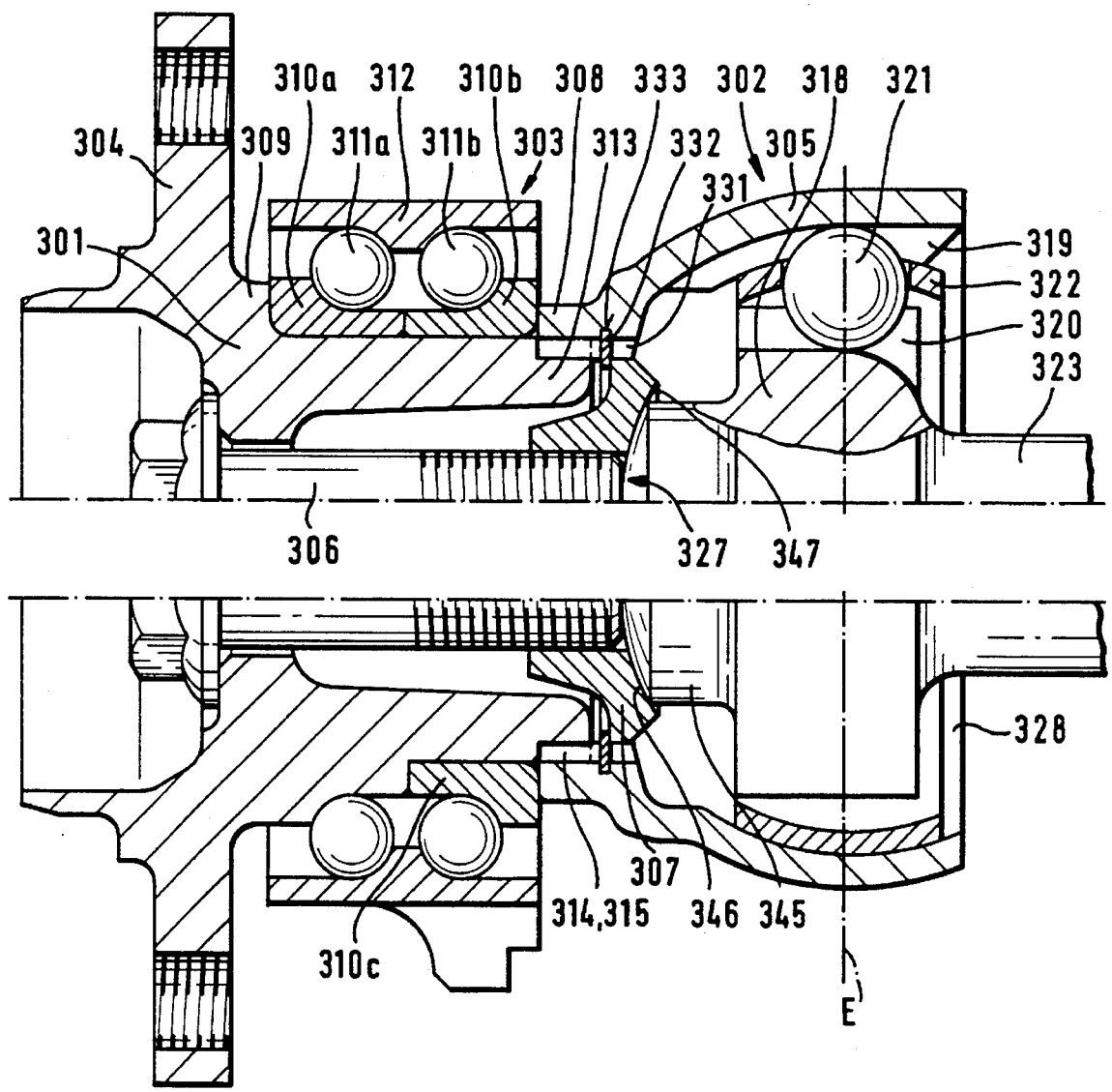
FIG. 8 is a longitudinal section view through an eighth embodiment of a wheel hub/universal joint unit in accordance with the invention.

In FIG. 8, the reference numbers of any details corresponding to those of FIG. 7 have been increased by 50. Again, the outer joint part 305 is designed as a formed plate metal part. FIG. 8 deviates from FIG. 7, but is similar to FIG. 6 in that the base part 307 is again designed as a nut of the bolt/nut tensioning assembly between the wheel hub and universal joint, with the bolt 306 supported on the wheel flange being threaded into said nut. Further deviations consist in that both the shaft 323 and the journal-shaped projection 345 are designed to be integral with the inner joint part 318. The journal-shaped projection, at its end face, includes a surface 346 which has the shape of a spherical segment and via which it is supported on an internally spherical surface 347 of the base part 307.

Figure 9:
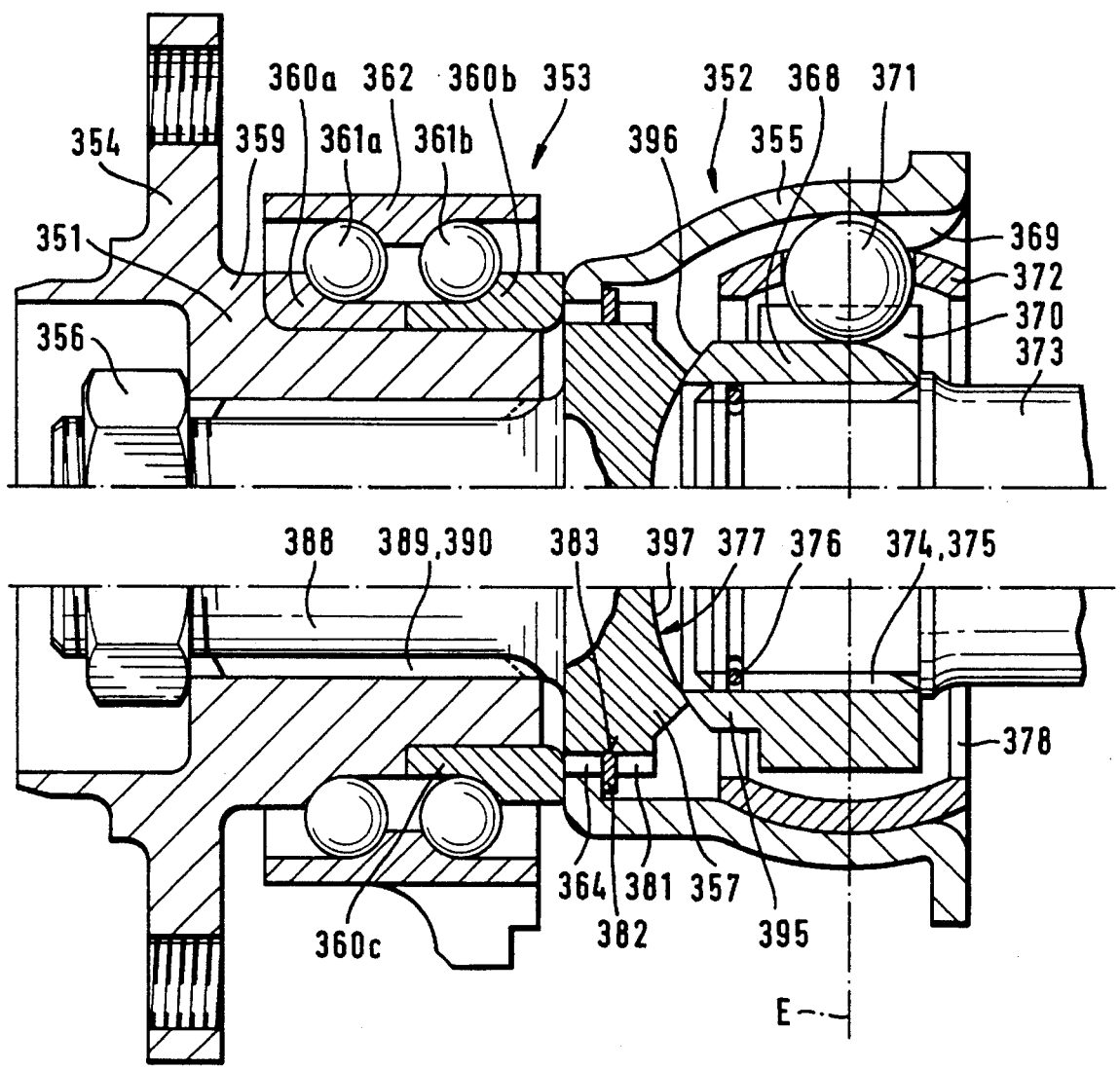
FIG. 9 is a longitudinal section view through a ninth embodiment of a wheel hub/universal joint unit in accordance with the invention.

In FIG. 9, the reference numbers of any details corresponding to those of FIG. 8 have been increased by 50. As shown in FIGS. 7 and 8, the outer joint part is designed as a formed plate metal part. The inner joint part 368 is provided with an annular projection 395 which is similar to that shown in FIG. 6 and which, via an end face 396 shaped like a spherical segment, is supported on a corresponding internally spherical face 397 of the base part 357. The base part is designed to be integral with a threaded journal 388, with a nut 356 supported on the wheel flange 354 being tensioned thereon. In the embodiment as shown in the upper half of the figure, the base part 357 is unremovably welded to the outer joint part 355. In the embodiment as illustrated in the lower half of the figure, the base part 357 is provided with outer teeth 381 which engage the inner teeth 364 of the outer joint part 355. The base part and outer joint part are axially secured by a retaining ring 382 which engages behind the wall of the outer joint part 355 and is positioned in an annular groove 383 in the outer teeth 381 of the base part. In this case, there is no direct transmission of torque between the outer joint part 355 and the wheel hub 351. The journal 388 serving as a bolt and provided at the base part includes outer teeth 390 which engage inner teeth 389 in the wheel hub 351, so that there takes place an indirect transmission of torque from the outer joint part 355 to the wheel hub 351 via the base part 357 which is located in the line of torque flow. The inner bearing rings axially project beyond the wheel hub which does not include a projection with teeth.

Figure 10A:
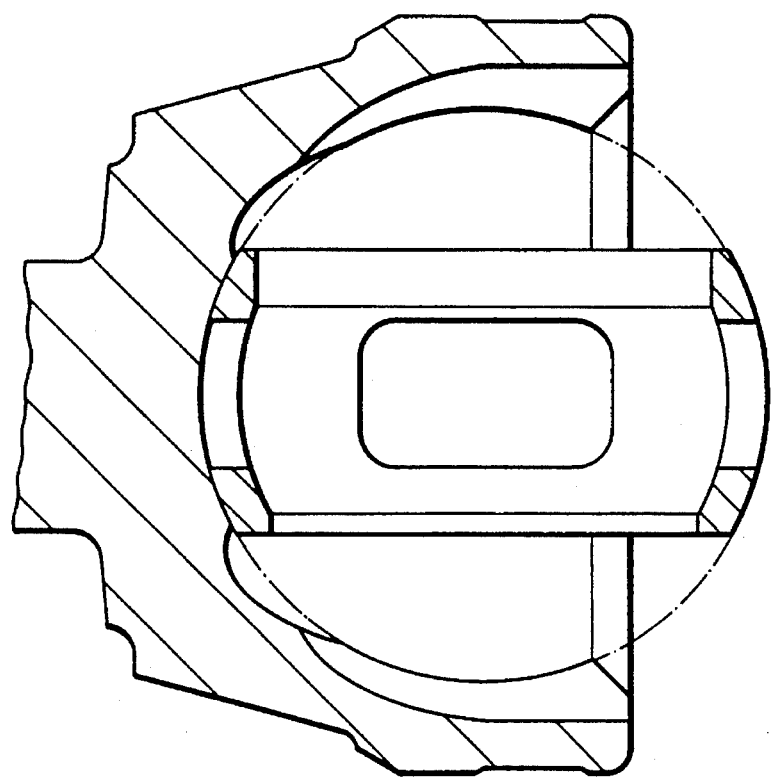
FIGS. 10a and 10b are section views of the assembly sequence for a joint according to the state of the art in two phases.
Figure 10B:
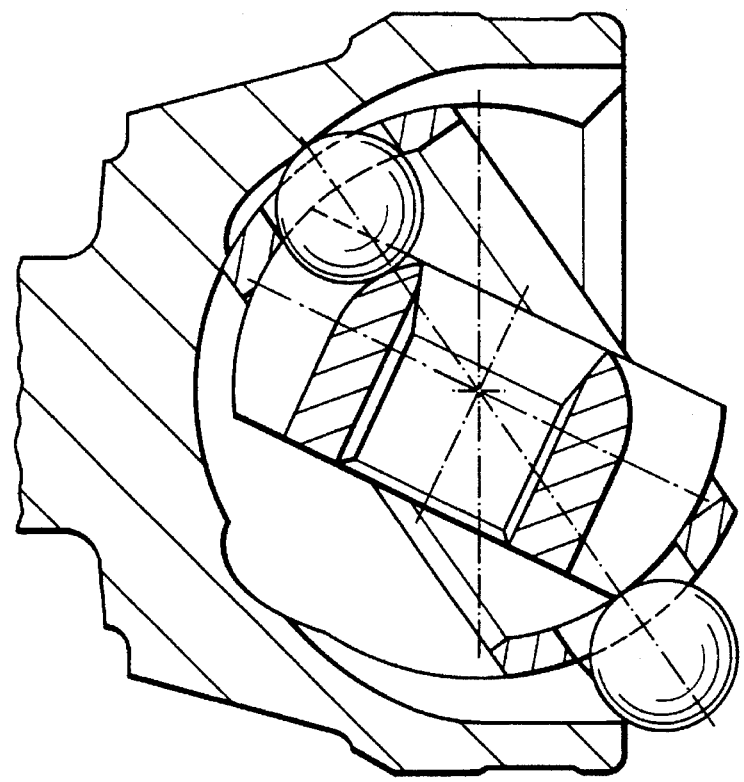

FIGS. 10a and 10b illustrate the assembly of joints according to the state of the art, in two phases. First, the cage, whose axis is pivoted by 90° relative to the outer joint part, is threaded into the outer joint part (FIG. 10a). Thereafter, the cage may be turned in the outer joint part so as to be positioned true to its function. The inner joint part (not illustrated) may already be coaxially positioned in the cage.

After the inner joint part and cage have been fitted in the outer joint part, the assembly angle as illustrated has to be set between the inner joint part and outer joint part, at which angle the cage, set to be positioned on the angle-bisecting plane, with one window, pivots out of the outer joint part, to permit a ball, through the window, to be introduced radially into the respective track of the inner joint part (FIG. 10b). By pivoting the inner joint part back relative to the outer joint part, the ball is then introduced from the end face into the respective track of the outer joint part.

The illustrations make it clear that the interior of the outer joint part, produced in one piece, cannot be reduced in size and especially, it cannot be axially shortened.

Figure 11A:
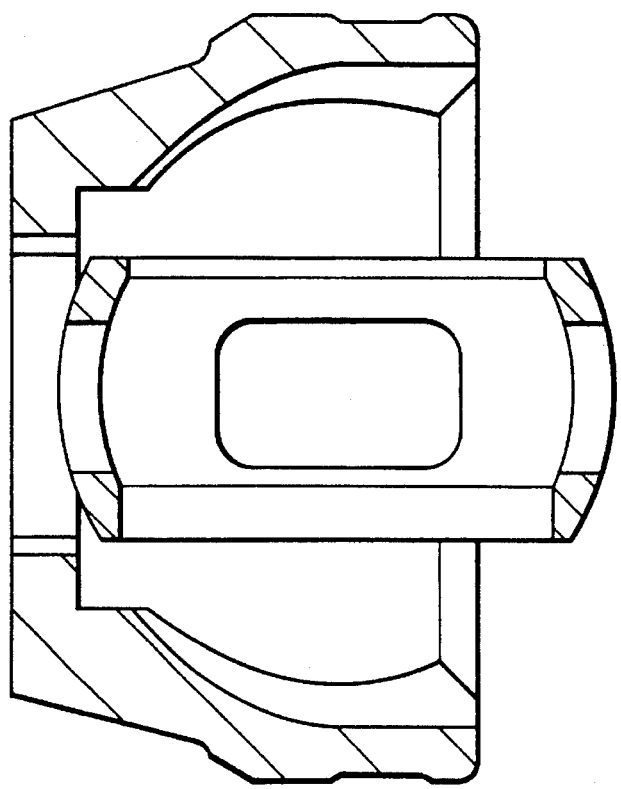
FIGS. 11a–11c are section views of the assembly sequence in several phases for a joint according to a first solution.
Figure 11B:
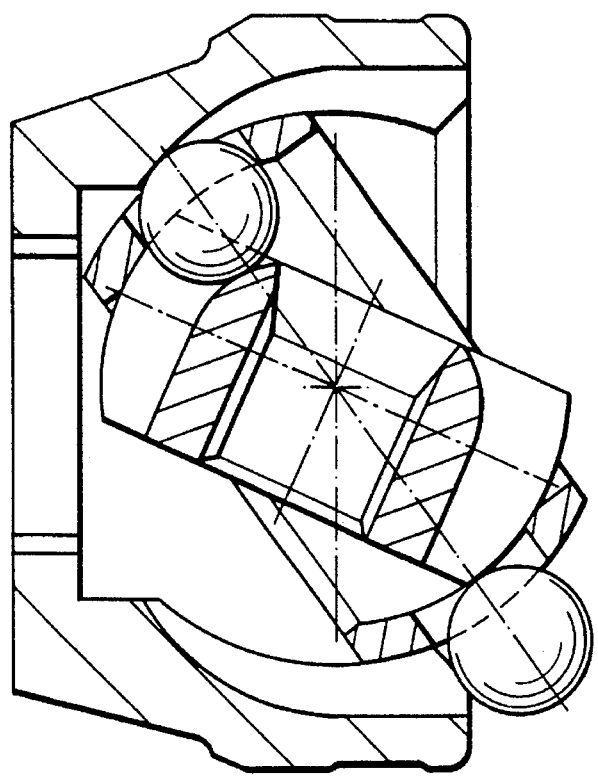
Figure 11C:
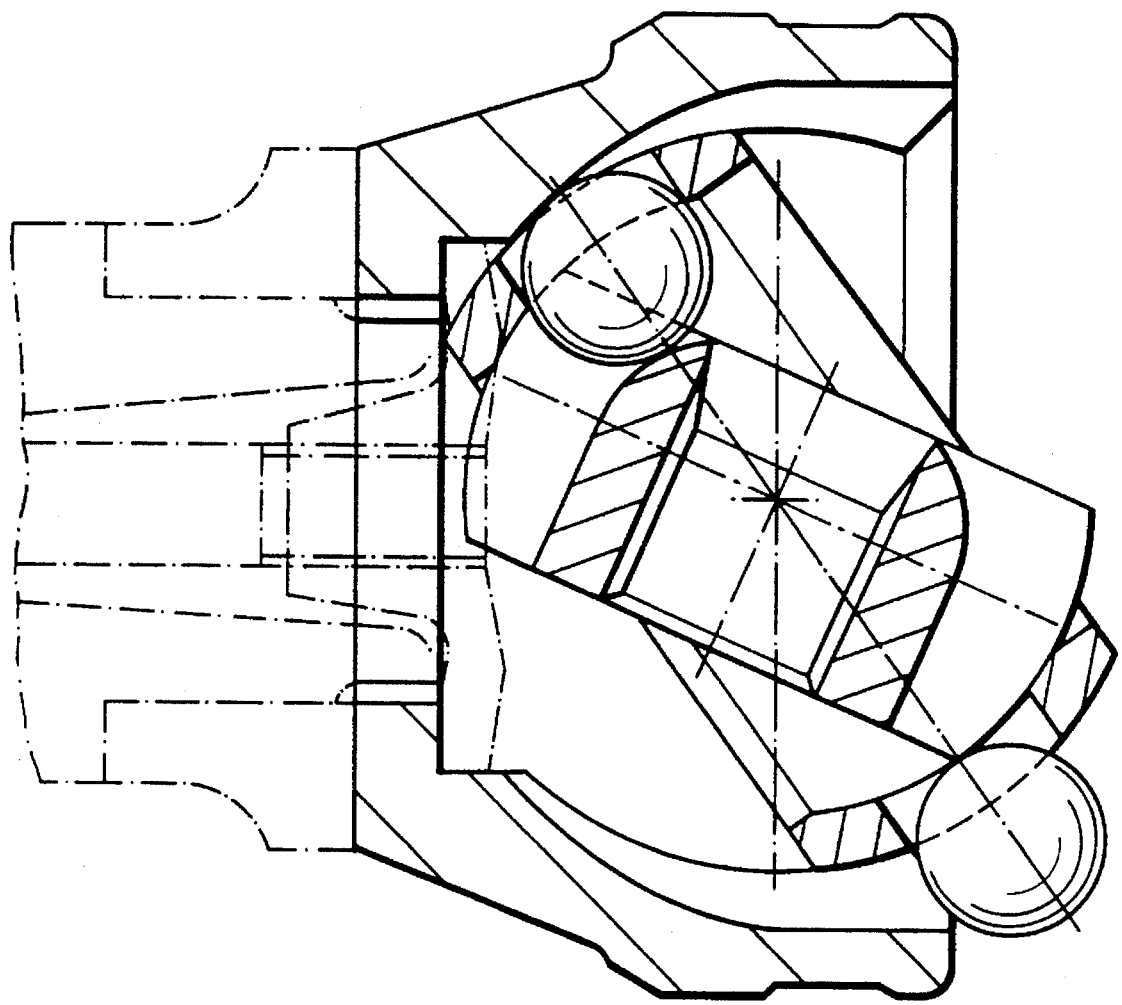

FIGS. 11a through 11c illustrate the assembly of joints according to FIGS. 1 to 5 in three phases. The illustrations of FIGS. 11a and 11b correspond to those shown in FIGS. 10a and 10b, although the ball cage, when being introduced into the outer joint part and during the insertion of the balls, enters the outer joint part aperture at the wheel hub end. FIG. 11c shows that this free space required for assembly purposes is occupied entirely by the base part which is introduced from the wheel hub end.

Figure 12A:
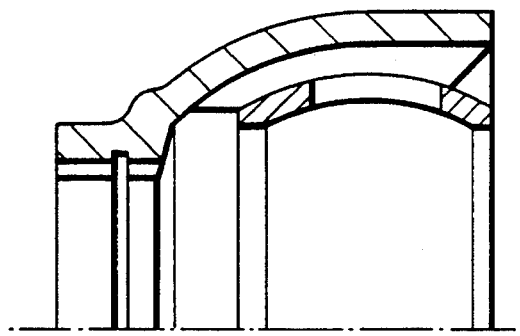
FIGS. 12a–12d are section views of the assembly sequence in several phases of a joint according to a second solution.
Figure 12B:
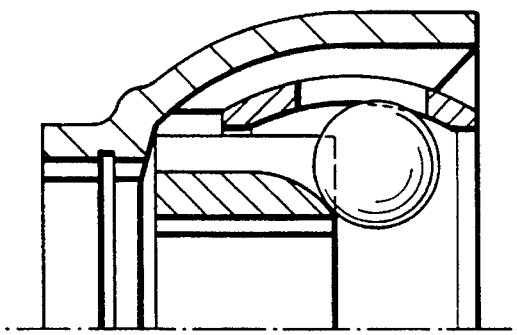
Figure 12C:
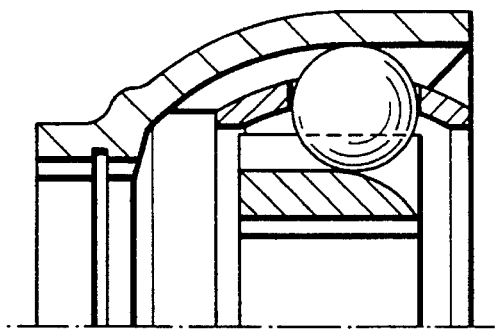
Figure 12D:
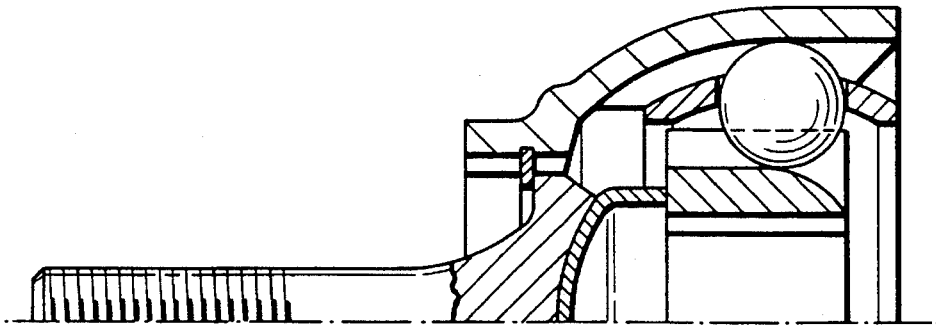

FIGS. 12a–12d show the assembly of joints according to FIGS. 6 to 9 in four phases. First, the cage, turned by 90°, is inserted into the outer joint part (not illustrated) and coaxially pivoted (FIG. 12a). Subsequently, the inner joint part is slid in axially and partially pushed through the cage. In this position, the balls are inserted through the cage aperture at the shaft end and introduced, from the inside to the outside, into the tracks of the outer joint part (FIG. 12b). Subsequently, the inner joint part is again pulled towards the shaft end so that, at the end face, the balls enter the tracks of the inner joint part (FIG. 12c). Finally, a supporting member is introduced through the outer joint part aperture at the hub end and, optionally, connected to the inner joint part. Subsequently, the base part is introduced into the aperture and secured via a securing ring (FIG. 12d).

While the above detailed description describes the preferred embodiment of the present invention, the invention is susceptible to modification, variation, and alteration without deviating from the scope and fair meaning of the subjoined claims.

I claim:

1. A constant velocity universal ball joint for a wheel hub/universal joint unit comprising:

a wheel hub, a universal ball joint with an inner and outer joint part, a bearing assembly arranged on the wheel hub and tensioned relative thereto by the outer joint part of the universal joint;

an unfastenable or disconnectable connection between the wheel hub and universal joint including a bolt/nut assembly comprising at least two parts;

said outer joint part and the inner joint part having longitudinally extending ball tracks which are arranged radially opposite one another and torque-transmitting balls which are held in said radially opposite one another ball tracks and are held in one plane in individual windows of a ball cage positioned between the outer joint part and the inner joint part and which, upon articulation of the joint, are moved on to the angle-bisecting plane, with the outer joint part, at a wheel hub-turned end, being closed by a base part and the inner joint part being connected to a shaft, said base part being insertable from the wheel hub-turned end into an aperture at the wheel hub-turned end and forming one of the parts of the bolt/nut assembly for holding the wheel hub, the bearing assembly and the outer joint part relative to one another, said base part being unfastenable from an abutment means on said outer joint part for said base part in the axial direction and said outer joint part on the one hand, and one of said base part and said wheel hub, on the other hand, each of the base part, wheel hub and outer joint part having form locking means mutually engaging one another in a rotational direction and that the base part connected to the outer joint part permanently extends into a space inside the outer joint part occupied temporary by the ball cage or the inner joint part during assembling of the joint.

2. A joint according to claim 1, wherein for the purpose of transmitting torque between the outer joint part and the wheel hub, said aperture at the wheel hub-turned end of said outer joint part is provided with inner teeth which are engaged by the wheel hub via outer teeth of the wheel hub.

3. A joint according to claim 2, wherein for the purpose of inserting the base part into the outer joint part and preventing the base part from rotating relative thereto, the base part is provided with flat portions which cooperate with projections in said aperture at the wheel hub-turned end of said outer joint part.

4. A joint according to claim 2, wherein for the purpose of being prevented from rotating relative to the outer joint part, the base includes outer teeth which also engage the inner teeth in the wheel hub end of the outer joint part.

5. A joint according to claim 1, wherein for torque transmitting purposes between the outer joint part and the wheel hub, said aperture of said outer joint part at the wheel hub-turned end is provided with inner teeth which are engaged by outer teeth of the base part and the base part is provided with a journal adjoining said base part at the wheel hub-turned end and having outer teeth which engage inner teeth in the wheel hub.

6. A joint according to claim 1 wherein the base part, towards the wheel hub-turned end of said outer joint part, is secured relative to the outer joint part by said abutment means, being a retaining ring inserted into said aperture of said outer joint part at the wheel hub-turned end.

7. A joint according to claim 1, wherein a securing ring may be inserted through the aperture of the outer joint part at the wheel hub-turned end and fitted for securing said shaft; with said shaft being plugged into the inner joint part after joint assembly has been completed.

8. A joint according to claim 1, wherein the space occupied by the base part, after it has been connected to the outer joint part is at least partially occupied by the ball cage and/or the inner joint part when an assembly angle for fitting the balls is being set, which assembly angle is greater than a maximum operating angle of the universal joint.

9. A method of assembling a constant velocity universal ball joint according to claim 8, characterised in that the inner joint part and cage are inserted into the outer joint part, that, while the assembly angle between the inner joint part and outer joint part is being set, the balls, from the outside, are individually and radially introduced into the cage windows and tracks of the inner joint part, that, by reducing said angle, they are, at the end face, introduced into the tracks of the outer joint part, and that after all balls have been inserted, the base part is introduced into the outer joint part from the hub end and connected to the outer joint part.

10. A joint according to claim 1, wherein the inner joint part may at least partially be coaxially slid through the ball cage, and the space occupied by the base part after said base part has been connected to the outer joint part, when fitting the balls, is at least partially occupied by the inner joint part and/or by a supporting member to be connected thereto, and that with an assembled universal joint, the inner joint part is supported on the base part via the abutment means.

11. A joint according to claim 10, wherein the circumferential length of said individual windows of the ball cage is limited to the dimension determined by the movement of the balls when setting the maximum operating angle of the universal joint.

12. A joint according to claim 10, wherein the inner joint part is supported on the base part via a cap attached to the inner joint part at the hub end and provided with an end face in the shape of a spherical segment.

13. A joint according to claim 10, wherein the inner joint part is supported on the base part via a coaxial journal-shaped projection provided with an end face in the shape of a spherical segment.

14. A joint according to claim 10, wherein the inner joint part is designed to be integral with said shaft.

15. A joint according to claim 10, wherein the inner joint part is supported on the base part via a coaxial annular projection provided with an end face in the shape of a spherical segment.

16. A method of assembling a constant velocity universal ball joint according to claim 10, characterised in that the inner joint part and cage are inserted into the outer joint part and that the inner joint part is at least partially pushed through the cage aperture at the hub end, that the balls are introduced through the cage aperture at the shaft end and inserted individually and radially from the inside into the cage windows and tracks of the outer joint part, that the inner joint part is pulled back towards the shaft end while the balls, at the end face, are introduced into the tracks of the inner joint part and that, subsequently, the base part is inserted into the outer joint part from the hub end and connected to the outer joint part.

17. A method according to claim 16, characterised in that prior to inserting the base part, a cap with an end face in the shape of a spherical segment is arranged on the inner joint part.

* * * * *

UNITED STATES PATENT AND TRADEMARK OFFICE
CERTIFICATE OF CORRECTION

PATENT NO. : 5,549,514
DATED : August 27, 1996
INVENTOR(S) : Hans-Heinrich Welschof It is certified that error appears in the above-indentified patent and that said Letters Patent is hereby corrected as shown below:

Column 4, line 28, after "joint unit" please insert --divided in half to illustrate two embodiments--

Column 4, line 33, after "joint unit" please insert --divided in half to illustrate two embodiments--

Column 4, line 36, after "joint unit" please insert --divided in half to illustrate two embodiments--

Column 4, line 39, after "joint unit" please insert --divided in half to illustrate two embodiments--

Column 4, line 43, after "joint unit" please insert --divided in half to illustrate two embodiments--

Column 4, line 47, after "joint unit" please insert --divided in half to illustrate two embodiments--

Column 4, line 50, after "joint unit" please insert --divided in half to illustrate two embodiments--

Column 4, line 53, after "joint unit" please insert --divided in half to illustrate two embodiments--

Column 4, line 57, after "joint unit" please insert --divided in half to illustrate two embodiments--

Column 9, lines 59-60, please delete "said outer joint part on the one hand, and one of said base part and said wheel hub, on the other hand,"

Column 10, line 5, Claim 2, please delete "the" (second occurrence) and substitute therefor --said--

Signed and Sealed this

Twenty-ninth Day of April, 1997

*Attest:*

BRUCE LEHMAN

*Attesting Officer*         Commissioner of Patents and Trademarks